(12) United States Patent
Su et al.

(10) Patent No.: US 7,443,803 B2
(45) Date of Patent: Oct. 28, 2008

(54) ESTIMATING AND MANAGING NETWORK TRAFFIC

(75) Inventors: Ching-Fong Su, Milpitas, CA (US);
Takeo Hamada, Cupertino, CA (US);
Kaoru Chujo, Hachioji (JP); Hung-ying Tyan, San Jose, CA (US); Xiangying Yang, Austin, TX (US); Takafumi Chujo, Hachioji (JP)

(73) Assignee: Fujitsu Limited, Kawasaki (JP)

( * ) Notice: Subject to any disclaimer, the term of this patent is extended or adjusted under 35 U.S.C. 154(b) by 989 days.

(21) Appl. No.: 10/808,715

(22) Filed: Mar. 23, 2004

(65) Prior Publication Data

US 2005/0213514 A1    Sep. 29, 2005

(51) Int. Cl.
*H04J 1/16* (2006.01)
(52) U.S. Cl. ...................... 370/252; 370/389
(58) Field of Classification Search ............... 370/252, 370/253, 254, 401, 351, 396, 397, 389, 230, 370/465, 466, 235, 395.1; 709/220, 221, 709/222
See application file for complete search history.

(56) References Cited

U.S. PATENT DOCUMENTS 6,788,688 B2 * 9/2004 Trebes, Jr. ............... 370/395.1

OTHER PUBLICATIONS

Saroiu, Stefan, et al., "An Analysis of Internet Content Delivery Systems", Department of Computer Science & Engineering, University of Washington, 7 unnumbered pages, in Proc. of the 5th Symposium on Operating Systems Design and Implementation (OSDI), Boston, MA, Dec. 2002.

Yang, Beverly, et al., "Designing a Super-Peer Network", Computer Science Department, Stanford University, pp. 1-21 and A-1-A4, in Proc. Of the 19th Int. Conf. On Data Eng. (ICDE), Mar. 2003, http://www-db.stanford.edu/~byang/pubs/superpeer.pdf.

Sen, Subhabrata, et al., "Analyzing Peer-to-Peer Traffic Across Large Networks", AT&T Labs-Research, 4 unnumbered pages, in Proc. of ACM SIGCOMM Internet Measurement Workshop, Marseilles, France, Nov. 2002.

Sandvine, "Peer-to-Peer File Sharing", pp. 1-13, whitepaper available from Sandvine web site www.sandvine.com, Dec. 2002.

Gerber, Alexandre, "P2P, The Gorilla in the Cable", AT&T Labs—Research, 6 unnumbered pages, National Cable & Telecommunications Association (NCTA) 2003 National Show, Chicago, IL, Jun. 8-11, 2003.

Morin, Marc, "Managing P2P Traffic on DOCSIS™ Networks", 8 unnumbered pages, 2003 Cable-TEC Expo, Philadelphia, PA, May 11-14, 2003.

(Continued)

*Primary Examiner*—Chi H. Pham
*Assistant Examiner*—Alexander Boakye
(74) *Attorney, Agent, or Firm*—Baker Botts L.L.P.

(57) ABSTRACT

Network traffic may be estimated using samples of network activities to identify traffic parameters. A model of the network may be generated using the traffic parameters, and the model can be used to simulate the network using a modified set of parameters. Network traffic may be managed using the results of the simulation. Network traffic can also be managed by intercepting and modifying a control message on a peer-to-peer network.

46 Claims, 3 Drawing Sheets

OTHER PUBLICATIONS

Leibowitz, Nathaniel, "Deconstructing the Kazaa Network", pp. 1-9, 3rd IEEE Workshop on Internet Applications (WIAPP'03), Jun. 23-24, 2003, San Jose, CA.

Ranganathan, Kavitha, et al., "To Share or not to Share' An Analysis of Incentives to Contribute in Collaborative File Sharing Environments", pp. 1-6, Workshop on Economics of P2P Systems, Jun. 5-6, 2003, Berkeley, CA.

Ripeanu, Matei, et al., "Mapping the Gnutella Network: Macroscopic Properties of Large-Scale Peer-to Peer Systems", pp. 1-6, 1st International Workshop on Peer-to-Peer Systems (IPTPS'02), Cambridge, Massachusetts, Mar. 2002.

* cited by examiner

ESTIMATING AND MANAGING NETWORK TRAFFIC

TECHNICAL FIELD OF THE INVENTION

The present invention relates in general to networks and, more particularly, to estimating and managing network traffic.

BACKGROUND OF THE INVENTION

Technological advances have created complex networks to connect computers. Estimations of traffic on these networks are invaluable to network designers and managers. For example, network designers use estimations of traffic on networks to design network infrastructure to handle actual network traffic.

SUMMARY OF THE INVENTION

In accordance with the present invention, techniques for estimating and managing network traffic are provided. According to particular embodiments, these techniques enable the estimation and management of network traffic based upon results of simulations incorporating modified and unmodified network parameters.

According to a particular embodiment, estimating network traffic includes receiving and analyzing connectivity information associated with a network to identify a set of parameters. The connectivity information includes samples of user activities stored by a node on the network, and the set of parameters includes a distribution of network resources across network regions of the network. A statistical model of the network is generated using the set of parameters. The statistical model mathematically predicts connectivity between the network regions. At least one of the parameters within the set is modified. The network is simulated using the modified set of parameters and the statistical model, and the results of the simulation are presented for use in managing the network.

In another embodiment, managing network traffic includes analyzing peer-to-peer communications between peers on a peer-to-peer network. Based on the peer-to-peer communications, peer-to-peer information is identified. The peer-to-peer information includes network addresses of the peers, a distribution of peers within the peer-to-peer network, and a distribution of data files stored by the peers. A control message sent from a first peer to a second peer is intercepted, and the control message is modified based on the peer-to-peer information.

Embodiments of the invention provide various technical advantages. These techniques enable the estimation of network traffic based upon simulations of networks using a set of parameters that can be modified. This can enable accurate estimation of current network traffic. These techniques may also increase the ability to predict future network traffic. More reliable estimations and predictions may be used to better design network infrastructure and to better control network traffic. For example, network traffic may be redirected using the results of these techniques. Furthermore, these techniques also reduce the cost associated with large-scale and repeated network traffic measurements.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
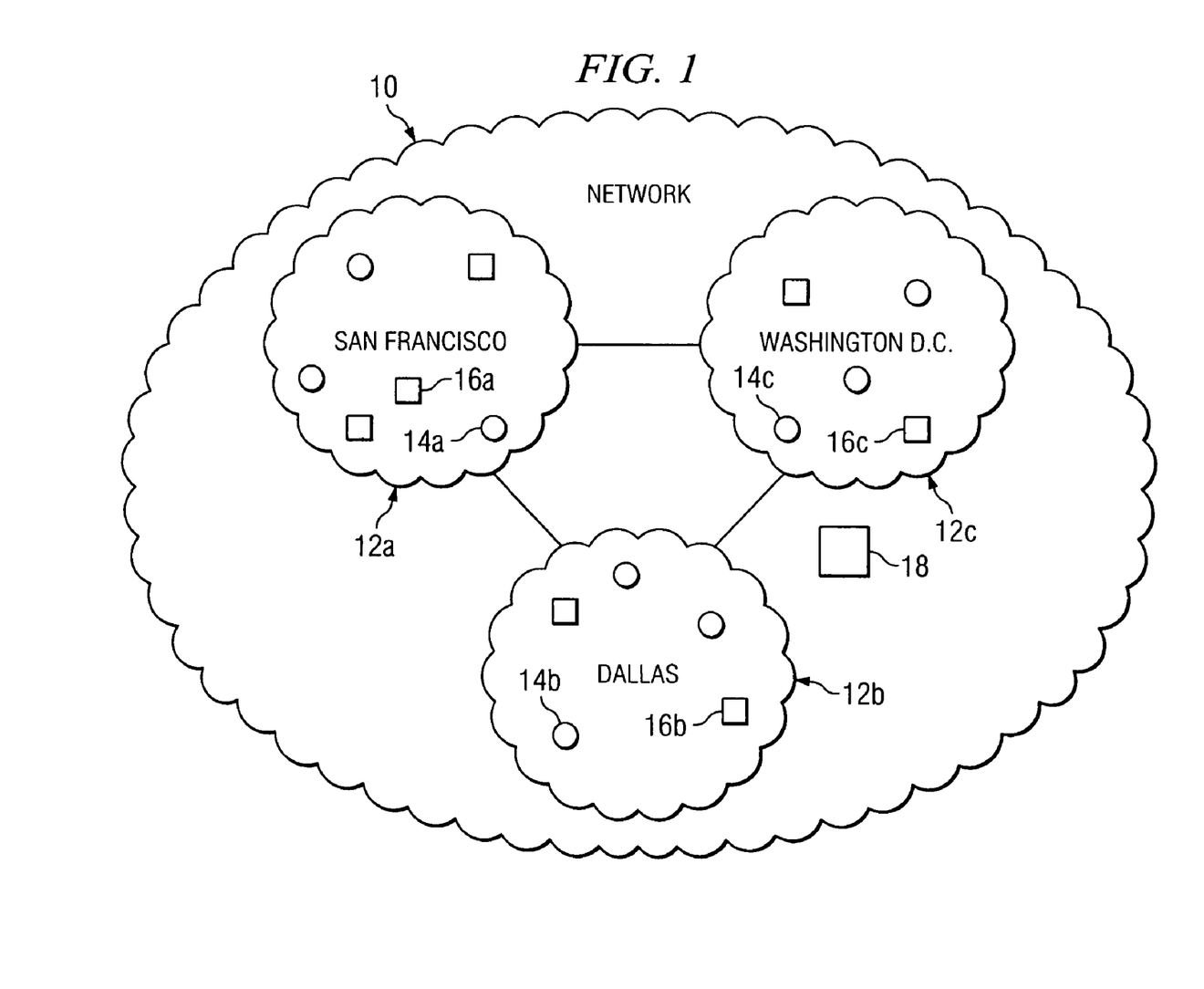
FIG. 1 illustrates a network that includes a monitor that operates in accordance with various embodiments of the present invention.

FIG. 1 illustrates a portion of a network, indicated generally at 10, that includes a number of network regions 12 and a monitor 18. In general, monitor 18 estimates network traffic on network 10. To estimate network traffic, monitor 18 may obtain information related to traffic on network 10 and identify parameters associated with the traffic. Monitor 18 may model and simulate network 10 in whole or in part based upon these or other parameters. Traffic estimations may be used in various ways. For example, traffic estimations may be used to design and/or manage various aspects of network 10.

Network 10 represents any suitable collection and arrangement of elements supporting data transfer and includes data sources, Internet Service Providers (ISPs), private computer systems, routers, cables, data destinations, and any other equipment used to transmit data. In particular embodiments, network 10 may include some or all of networks such as the Internet, the World Wide Web, a peer-to-peer network, the public switched telephone network (PSTN), or any other network.

Network regions 12 represent collections of selected network elements. Network regions 12 may be determined in various manners. For example, network regions 12 may be physically determined based on location, network links, or other appropriate characteristics. Alternatively or additionally, network regions 12 may be logically determined based on network addresses or other appropriate characteristics. In particular embodiments, network regions 12 may be cities, counties, states, countries, continents, or subdivisions or groupings of these or similar areas. As illustrated, network region 12a represents the city of San Francisco, network region 12b represents Dallas, and network region 12c represents Washington D.C.

Within a particular network region 12, various network elements may be present. Two types of network elements, aggregators 14 and peers 16, are illustrated. Collectively, aggregators 14 and peers 16 represent nodes on network 10. Aggregators 14 aggregate information useful in estimating traffic on network 10. Examples of information aggregated by aggregators 14 include identification of sources, destinations, and sizes of data transfers over network 10. Aggregators 14 also may aggregate information related to numbers of users on network 10, amounts of time users couple to and use network 10, types of applications used by users in association with network 10, and types of data exchanged by users on network 10. Information aggregated by aggregators 14 may be stored as cache information or in various other forms including log files. Aggregators 14 include sources, routers, ISPs, private computer systems, destinations, and other network elements through which data travels while in network 10.

For example, data may travel from a source in San Francisco to a destination in Dallas. Thus, data may travel through aggregator 14a, which is located in San Francisco, and aggregator 14b, which is located in Dallas. In this situation, aggregators 14a and 14b may obtain information regarding the data transfer. This information can be stored in the cache of aggregators 14a and 14b and may include information such as the Internet Protocol (IP) addresses of the source and the destination, the size and time of the data transfer, and the type of data transferred. Similar information may be obtained by aggregator 14c, which is located in Washington D.C., for data transfers through or within Washington D.C. Alternatively or additionally, aggregators 14a and 14b may aggregate information that tracks general trends in data transfers through these points on network 10 without recording or reporting unique identifiers of specific data transfers. For example, aggregators 14 may record volumes of network traffic at particular times of the day or days of the week, statistics identifying file types exchanged as a proportion of all network traffic, or any other appropriate information.

Peers 16 couple to one another on a peer-to-peer network that operates to share data on network 10. Peer-to-peer networks establish direct content transfers between peers. A peer 16 may request and receive data, in the form of data files, and other information from another peer 16 on the peer-to-peer network. For example, the peer-to-peer network associated with peers 16 allows for peer 16a, located in San Francisco, to request and receive data and other information from either peer 16b, located in Dallas, or peer 16c, located in Washington, D.C. Thus, peer 16a may request peer 16b to provide peer 16a with information relating to what data peer 16b is willing to share. Peer 16a may also request data from peer 16b. Peer 16a can also request and receive data from another peer 16 located within San Francisco. Examples of peer-to-peer networks include Gnutella, Kazaa, and Freenet.

Network 10 also includes monitor 18, which operates to estimate traffic on network 10. Monitor 18 may receive information from aggregators 14 and peers 16. For example, monitor 18 may couple to the peer-to-peer network created by peers 16a, 16b, and 16c. In operation, monitor 18 may act in a manner similar to peers 16 by sending requests to the peer-to-peer network and responding to requests on the peer-to-peer network. Data and other information obtained from the peer-to-peer network by monitor 18 may be useful in estimating traffic on network 10. Although monitor 18 is illustrated in one particular location of network 10, it should be understood that monitor 18 may be located in any location within or outside of network 10.

Figure 2:
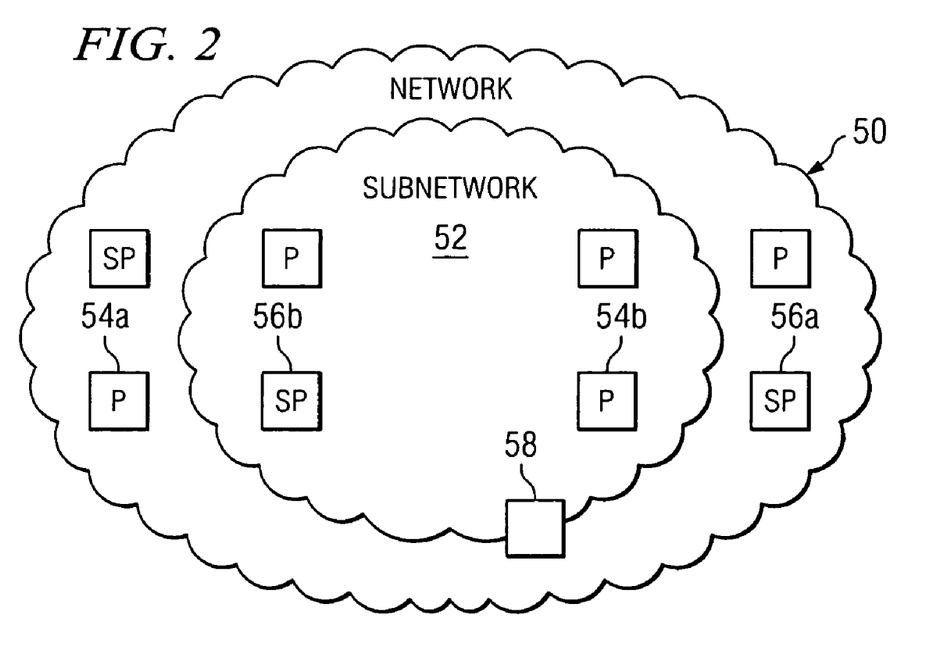
FIG. 2 illustrates a peer-to-peer network that includes a peer-to-peer monitor that operates in accordance with one embodiment of the present invention.

FIG. 2 illustrates a peer-to-peer network 50 that includes a peer-to-peer monitor 58. In general, peer-to-peer monitor 58 obtains information relevant to parameters associated with traffic on peer-to-peer network 50, creates a model of the network, simulates the network using the parameters, and uses the results of the simulation to manage the transmission of data on peer-to-peer network 50. Peer-to-peer network 50 includes a peer-to-peer subnetwork 52, normal peers 54, super peers 56, and peer-to-peer monitor 58.

Peer-to-peer network 50 represents any suitable collection and arrangement of elements supporting data transfer between peers, including normal peers 54 and super peers 56. Peer-to-peer network 50 may be arranged into various subnetworks, such as peer-to-peer subnetwork 52. Peer-to-peer subnetwork 52 may, for example, be a private network.

Normal peers 54 and super peers 56 exchange data on peer-to-peer network 50 and include any hardware and software capable of transmitting and receiving data over peer-to-peer network 50. Note that super peers 56 may differ from normal peers 54 in that super peers 56 may operate to control the manner in which data is transferred between peers within network 50. For example, when a peer, such as normal peer 54a, desires to receive data from another peer, normal peer 54a may send a request for data. However, the request for data may not proceed directly from normal peer 54a to a normal peer 54b or multiple normal peers 54. Instead, the request may proceed to a super peer 56, such as super peer 56a or super peer 56b. The super peer 56 receiving the request for data may then answer the request for data or direct the request to a specific peer, such as normal peer 54b.

Peer-to-peer monitor 58 is a particular adaptation of monitor 18. Peer-to-peer monitor 58 not only estimates traffic on peer-to-peer network 50 but also uses traffic estimations to manage subnetwork 52. Peer-to-peer monitor 58 may reside in various places. As illustrated, peer-to-peer monitor 58 resides within a gateway of subnetwork 52.

Figure 3:
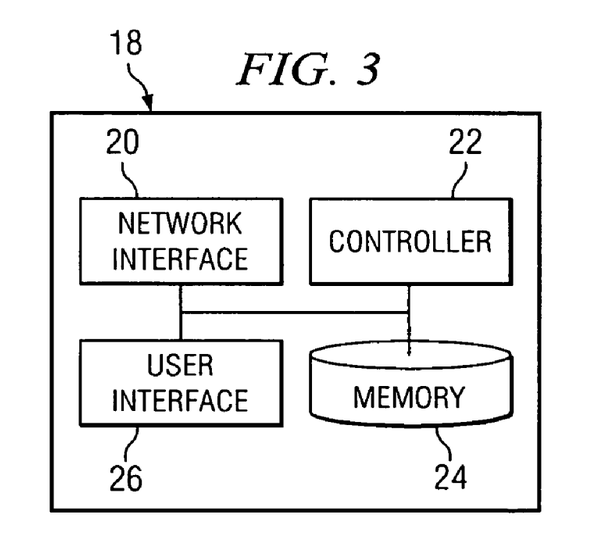
FIG. 3 is a block diagram illustrating functional components of a monitor.

FIG. 3 is a block diagram illustrating functional components of monitor 18. In general, monitor 18 obtains information relevant to parameters associated with traffic on a network, creates a model of the network, and simulates the network using the parameters. Monitor 18 includes a network interface 20, a controller 22, memory 24, and a user interface 26. These functional elements operate to estimate network traffic in accordance with the present invention.

Network interface 20 couples to network 10 and allows monitor 18 to send information to and receive information from network 10. Network interface 20 supports appropriate communications protocols and includes any hardware operable to couple monitor 18 to network 10. For example, network interface 20 may be any suitable wireline or wireless network interface device.

Controller 22 controls the operation and administration of elements within monitor 18. For example, controller 22 operates to process information received from network 10 through network interface 20, information stored in memory 24, and information inputted to monitor 18 through user interface 26. Controller 22 includes any hardware and/or logic elements operable to control and process information. For example, controller 22 may be a microcontroller, processor, programmable logic device, and/or any other suitable processing device.

Memory 24 stores, either permanently or temporarily, data and other information for processing by controller 22 and for use by other elements in monitor 18. Memory 24 may store information for communication to remote devices, information received from remote devices, computer programs for use by monitor 18, or other suitable information. Memory 24 represents any one or combination of volatile or non-volatile local or remote devices suitable for storing information. For example, memory 24 may include random access memory (RAM) device, read only memory (ROM) devices, magnetic storage devices, optical storage devices, or any other suitable information storage devices or combination of these devices.

User interface 26 communicates information to and receives information from a user of monitor 18. For example, through user interface 26, an administrator can input information and control processes performed by controller 22. Also, user interface can communicate results of processes performed by controller 22 to an administrator. Thus, user interface 26 represents any suitable hardware or controlling logic, such as a keyboard, mouse, display, or any other device, used to communicate information to or from a user of monitor 18. User interface 26 may also allow a user to remotely access monitor 18, for example, in combination with network interface 20.

In operation, controller 22 estimates traffic on network 10 using information obtained through network interface 20, user interface 26, and/or memory 24. For example, controller 22 may obtain information associated with traffic on network 10 from aggregators 14 and/or peers 16 through network interface 20. Controller 22 may also obtain information, such as published information associated with network 10 or other networks, through user interface 26 and/or memory 24. Controller 22 may analyze the information it obtains to identify parameters associated with traffic on network 10. Alternatively or additionally, the parameters may be specified in instructions obtained by controller 22.

The information and/or the parameters may be used by controller 22 to create a model of network 10. The model may be used to simulate current and/or future states of network 10 or various other networks. For example, one or various parameters may be modified to forecast an actual change in network 10, such as a change in network topology. The processes, parameters, and models used by controller 22, as well as the results of simulations, may be stored in memory 24 and/or presented to users of monitor 18 using user interface 26.

The results of simulations may also be used to design or manage various aspects of network 10. For example, controller 22 may use the results to direct network traffic. In one embodiment, monitor 18 may operate in the manner discussed in association with FIG. 5 to intelligently direct requests for data on a peer-to-peer network within network 10.

While this example includes specific functional components for monitor 18, monitor 18 may contain any collection and arrangement of components, including some or all of the enumerated functional components, for estimating traffic on network 10. Moreover, monitor 18 contemplates implementing each of the functional components using any suitable combination and arrangement of hardware and/or logic, and implementing any of the functionalities using a computer program stored on a computer readable medium.

Figure 4:
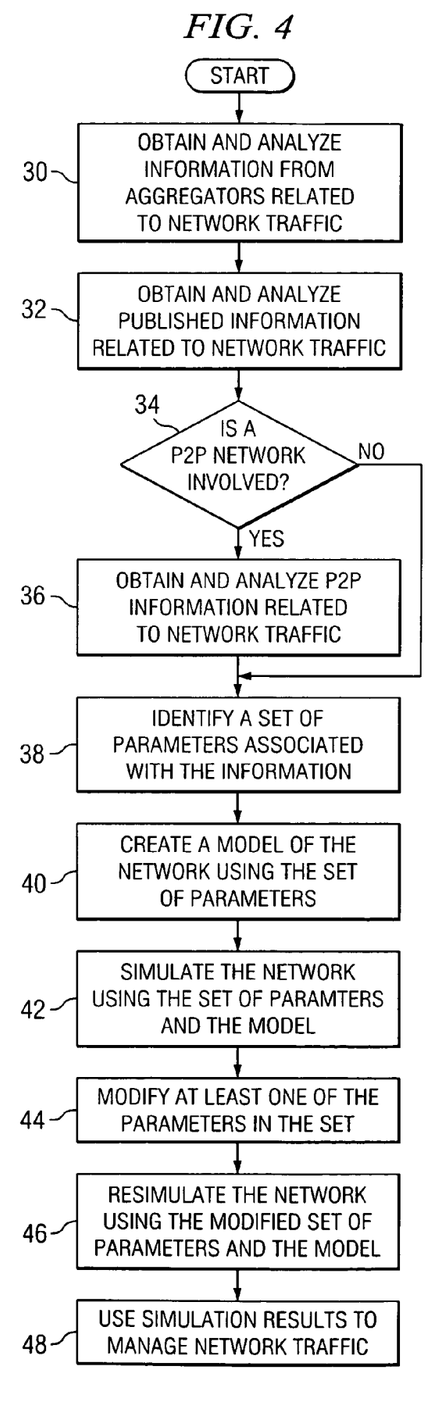
FIG. 4 is a flowchart illustrating a method for estimating and managing network traffic.

FIG. 4 is a flowchart illustrating a method for estimating and managing network traffic. Monitor 18 first obtains and analyzes information stored by aggregators 14 at step 30. Monitor 18 may obtain information in various ways. For example, monitor may request and receive information using network interface 20 or a user may input information using user interface 26.

As discussed previously, information stored by aggregators 14 includes cache information and log files. Cache information, log files, and other information stored by aggregators 14 may include data traces, which recall clicks by users when the users access and use Web sites on the World Wide Web. These data traces may be obtained from various aggregators 14 such as www.ircache.net, information technology departments of large companies, information technology departments of universities, and any other routers and servers on network 10. Cache information and log files may also include other information, such as information relating to e-mail and instant messaging correspondence.

Thus, for example, when network 10 is the World Wide Web, cache information and log files stored in aggregators 14 may be obtained by monitor 18. These data traces and other information may identify the IP addresses of World Wide Web servers, the number of users accessing these servers, the IP addresses of users accessing these servers, the progression of clicks through various Web pages, the number of click-throughs related to various Web pages, the size of data transfers related to click-throughs, and/or other information related to use of network 10.

Monitor 18 analyzes the information it obtains in various ways. For example, using file extensions, monitor 18 may identify the data format associated with data transfers occurring over network 10. Also, IP addresses related to servers and users may be used to obtain the geographic locations corresponding to these servers and users. Monitor 18 may also perform various mathematical operations, such as averaging, on numerical information obtained.

Monitor 18 next obtains and analyzes published information at step 32. Published information includes any known information relating to usage of network 10. For example, published information may include statistics related to the relative uses of broadband and other technologies to connect to network 10. Published information may also identify specific types of applications used in connection with network 10. Published information may be obtained in various manners. For example, published information may be obtained through user interface 26 or an automated process.

Monitor 18 determines whether a peer-to-peer network is involved at step 34. If a peer-to-peer network is involved, monitor 18 obtains and analyzes peer-to-peer information at step 36. Peer-to-peer information includes many of the same types of information discussed previously. However, peer-to-peer information may also include information specific to peer-to-peer networks. Thus, for example, peer-to-peer information may include numbers of peers 16 on the peer-to-peer network, numbers of data files stored by specific peers 16, total numbers of data files on the peer-to-peer network, percentages of peers 16 on the peer-to-peer network storing the same data file, distributions of data files, data file sizes, data file extensions, frequencies of different requests, and any other information related to use of the peer-to-peer network.

To obtain peer-to-peer information, monitor 18 may run a probing agent on network 10. Probes include requests sent and results received from peers 16 on the peer-to-peer network. Thus, monitor 18 may send requests for information to peers 16 and receive responses from peers 16. Requests may include queries for specific information or queries including wild cards.

Monitor 18 also analyzes the peer-to-peer information it obtains in various ways. For example, using file extensions, monitor 18 may identify the data format associated with data transfers occurring over the peer-to-peer network. The data format may indicate the size and/or time-dependency of associated data files. Also, IP addresses related to peers 16 may be used to obtain the geographic locations corresponding to these peers 16. Monitor 18 may also perform various mathematical operations, such as averaging, on numerical information obtained.

Monitor 18 identifies a set of parameters associated with traffic on network 10 at step 38. The set of parameters may be identified in various ways. For example, a user of monitor 18 may select a set of parameters using user interface 26. Also, monitor 18 may store a set of parameters in memory 24.

The set of parameters may include, for example, aspects related to network topology, network geography, user population, user activities, and application behaviors. Network topology includes the characteristics of technologies used by network 10 to transport data between points, including physical and virtual characteristics of network elements. Examples of network topology include the configuration of the network, the speed of routers, and the bandwidth of fiber optic cables. Network geography includes the distribution and location of network elements such as data sources and servers. User population includes the number of individuals connecting to network 10 as well as the number of individuals who conceivably might use network 10 at some time. User activities include time connected to network 10, number of requests for data sent over network 10, locations of servers utilized by users, and types of data accessed by users. Application behaviors include data formats, sizes of data transfers to users, and characteristics of usage of network 10. However, while specific examples have been discussed, note that the set of parameters may include any of the enumerated parameters and any other aspect or aspects of network 10 or its use that affect traffic on network 10. Also, each parameter may be quantified mathematically.

Monitor 18 next creates a model of network 10 using the set of parameters at step 40. The model estimates traffic on network 10 based upon the current set of parameters and the information obtained which relates to the set of parameters. Various models may be employed by monitor 18.

For example, one technique creates a model of network 10 by treating user activity on the World Wide Web as Markov processes. As such, the probability of a transition from a current network state (e.g., use of Web page f) to a future network state (e.g., use of Web page g) only depends upon the current network state (e.g., hyperlinks on Web page f) and not historical user activity. Using this technique, user activity may be modeling using matrixes.

Consider a probability matrix (W) that represents user activity on particular Web pages. Since user activity on the Web is treated as a Markov process, the future state (W[t+1]) can be obtained by multiplying the current state (W[t]) by a transition matrix (T):

$$W[t+1] = W[t] \times T \tag{1}$$

In practice, transition matrix T depends on hyperlinks in Web pages and each hyperlink's popularity. In other words, transition matrix T describes the probability that a user may click on any hyperlink on a certain Web page.

Also consider a different probability matrix (P) that represents user activity corresponding to geography. Again treating user activity on the Web as a Markov process, the future geographical state (P[t+1]) can be obtained by multiplying the current geographical state (P[t]) by another transition matrix (A):

$$P[t+1] = P[t] \times A \tag{2}$$

In practice, transition matrix A depends on the locations of Web servers. In other words, transition matrix A describes the probability that a user may use a Web server in a particular network region.

Note that transition matrix A may be defined in terms of transition matrix T and a geo-mapping matrix (G):

$$A = G^{-1} \times T \times G \tag{3}$$

The geo-mapping matrix converts and aggregates the probability that a user is accessing a Web page to a different probability: that a user is accessing a page located in a network region. However, since state matrix P provides geographical information, the size of state matrix P is 1-by-n, where n is the number of geographical regions under study. By contrast, since state matrix W provides information on Web pages, the size of state matrix W is 1-by-m, where m is the number of Web pages on the entire World Wide Web. Therefore, since the number of geographical regions under study can be made relatively small when compared to the number of Web pages on the World Wide Web, transition matrix A is more easily determined than transition matrix T.

To determine transition matrix A, information obtained from aggregators 14 may be used. For example, log files of user activities stored in aggregators 14 provide samples of network activity on the Web. The log files typically include information such as successive Web pages visited and Uniform Resource Locators (URLs) and IP addresses associated with these Web pages. The URL and IP addresses may be translated to the geographic information such as locations and regions. Each consecutive Web page visit is therefore a sampling of the transition matrix A.

For example, suppose that the log files include a number of occurrences ($x_{ij}$) that any user jumps from a Web page in one geographic location (i) to a Web page in another geographic location (j). An estimator ($\overline{A}$) for transition matrix A may be defined as follows:

$$\overline{A}(i, j) = \frac{x_{i,j}}{\sum_k x_{i,k}}, \forall\, i, j \tag{4}$$

Using this estimator, probability matrix P may be computed by choosing an arbitrary initial geographic state (P[0]) and recursively multiplying with $\overline{A}$ until the result converges. In other words, multiply with $\overline{A}$ until the error margin falls within a predetermined threshold ($\Delta$):

Step 1: $P[t+1] = P[t] \times \overline{A}$

Step 2: $P = P[t+1]$, if $\|P[t+1] - P[t]\| \leq \Delta$ \hfill (5)

Otherwise, t=t+1 and continue with step 1.

In this manner, monitor 18 can create a geographic model of network 10. It should be understood, however, that various other models of network 10 may be created in similar or other manners.

Now returning to the flowchart, monitor 18 simulates network 10 using the set of parameters and the model at step 42. The simulation estimates and predicts traffic on network 10 as usage of network 10 is defined by the set of parameters. Controller 22 may run the simulation using JavaSim. However, it should be understood that the simulation may implemented using any type of software or hardware.

Monitor 18 modifies at least one of the parameters in the set of parameters at step 44. For example, the population of users may be increased, the geographic distribution of Web servers may be more concentrated in one area, and/or the total number of users on a peer-to-peer network may be increased. While specific examples have been listed, it should be understood that monitor 18 may modify any aspect or aspects of network 10 or its use that affect traffic on network 10.

Thereafter, monitor 18 resimulates network 10 using the modified set of parameters and the model at step 46. The resimulation estimates and predicts traffic on network 10 as usage of network 10 is defined by the modified set of parameters. Again, controller 22 may run the resimulation using JavaSim. However, it should be understood that the resimulation may implemented using any type of software or hardware.

The results of the simulations may be used to design and/or manage network 10 in various manners at step 48. In one embodiment, the results may be used to determine appropriate modifications to network topology. For example, the results may suggest that increased bandwidth be provided between network regions 12. Alternatively or additionally, the results may be used to manage network traffic intelligently with regard to traffic patterns. For example, the results may indicate appropriate protocols for handling surges in network traffic. These or other uses of the results of the simulations may better enable network 10 to accommodate existing or predicted network traffic.

Figure 5:
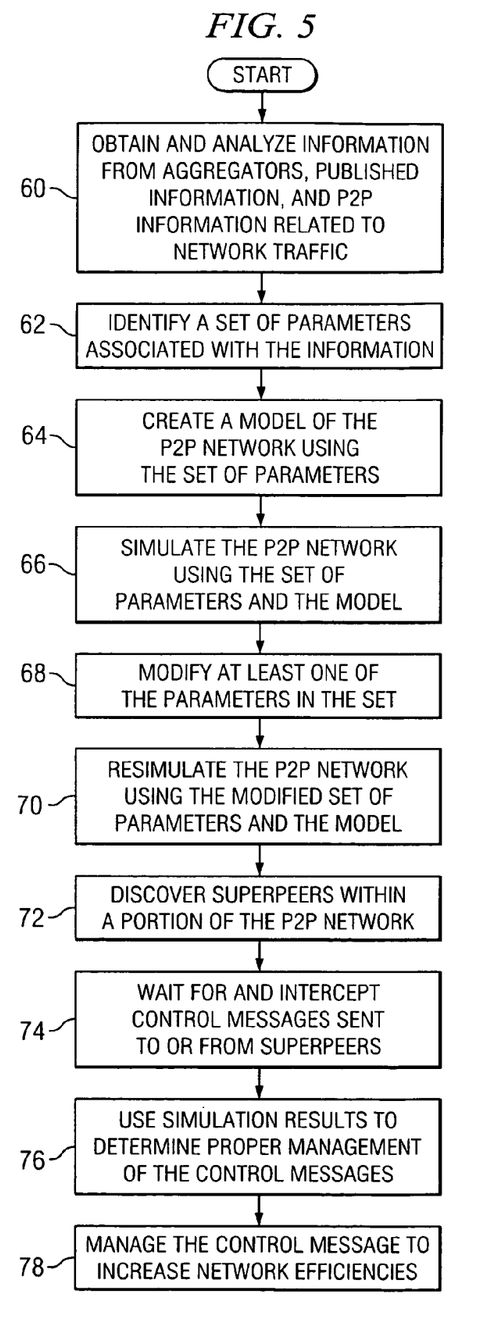
FIG. 5 is a flowchart illustrating a method for estimating and managing network traffic associated with a peer-to-peer network.

FIG. 5 is a flowchart illustrating a method for estimating and managing network traffic associated with peer-to-peer network 50. Peer-to-peer monitor 58 obtains and analyzes information stored by aggregators 14, published information, and peer-to-peer information at step 60. As discussed previously with regard to monitor 18, peer-to-peer monitor 58 may obtain and analyze this information in various ways.

Peer-to-peer monitor 58 identifies a set of parameters associated with traffic on the peer-to-peer network 50 at step 62 and creates a model of peer-to-peer network 50 using the set of parameters at step 64. As discussed previously with regard to monitor 18, various parameters may be identified in various ways and various models may be employed. One parameter that peer-to-peer monitor 58 may identify is a list of peers 54 and 56 organized by geographic location or associated bandwidth. Another possible parameter is network status, such as the congestion of traffic on peer-to-peer network 50, as a function of time. Yet a third potential parameter is policies peer-to-peer network 50 use to determine which peers 54 and 56 respond to requests for data.

At step 66, peer-to-peer monitor 58 simulates peer-to-peer network 50 using the set of parameters and the model. As discussed previously with regard to monitor 18, peer-to-peer monitor 58 may perform various simulations.

Peer-to-peer monitor 58 then modifies at least one of the parameters in the set of parameters at step 68 and resimulates peer-to-peer network 50 at step 70. As discussed previously with regard to monitor 18, various parameters may be modified to create various simulations.

Peer-to-peer monitor 58 discovers super peers 56 within a portion of peer-to-peer network 50 at step 72. Super peers 56 may be identified in various ways. Super peers 56 may be directly identified using available protocols in particular peer-to-peer networks. However, peer-to-peer monitor 58 may use any suitable techniques for identifying super peers 56. After discovering super peers 56, peer-to-peer monitor 58 waits for and intercepts control messages sent to or from a super peer 56 at step 74. These messages may be intercepted, for instance, by identifying IP addresses associated with messages sent into or out of subnetwork 52.

Peer-to-peer monitor 58 uses simulation results from steps 66 and 70 to determine proper management of the control message at step 76. Proper management includes redirecting the control message to a destination not specified in the control message, waiting to forward the control message to the destination specified in the control message, discarding the control message, reordering the order of several control messages, and any other task that may increase the efficient use of peer-to-peer network 50.

For example, peer-to-peer monitor 58 may choose to restrict the control message to a normal peer 54 in a specific ISP, geographic location, or region in order to reduce the geographic distance associated with sharing data over peer-to-peer network 50. Or peer-to-peer monitor 58 may select to redirect the control message to avoid faults on peer-to-peer network 50. Peer-to-peer monitor 58 may also decide to delay forwarding the control message to reduce congestion on peer-to-peer network 50 or to dismiss the control message to prevent excessive bandwidth usage by a particular normal peer 54 or super peer 56. Peer-to-peer monitor 58 may also choose to restrict some types of data transfers in favor of other types of data transfers, like audio-visual streaming, to maintain appropriate qualities of service. Another option peer-to-peer monitor 58 may elect is to create or reorder a directory of peers 54 and 56 and to forward the directory to a requesting peer 54 or 56. This directory may organize peers 54 and 56 by geographic proximity to the requesting peer 54 or 56 and/or by bandwidth associated with peers 54 and 56. Peer-to-peer monitor 58 may alter search results to show only peers in subnetwork 52, to reorder the search results, for example, to list closer peers first, or in any other appropriate manner. While specific management techniques have been listed, it should be understood that any management technique that seeks to increase network efficiency may be selected.

Other techniques may filter data types, for example to prevent illegal pirating of software or music. Still other techniques may direct data transfers to flow through a secure node that filter data. Whatever management technique is determined, however, peer-to-peer monitor 58 manages the control message in accordance with the determined management technique at step 80. Moreover, peer-to-peer monitor 58 may manage peer-to-peer traffic completely separate from traffic estimation.

The proceeding flowcharts in this description illustrate particular methods for estimating and managing network traffic. However, these flowcharts illustrate only exemplary methods of operation, and monitor 18 and peer-to-peer monitor 58 contemplate using any suitable techniques, elements, and applications for performing these functions. Thus, many of the steps in these flowcharts may take place simultaneously and/or in different orders than as shown. In addition, methods with additional steps, fewer steps, and/or different steps may be utilized so long as the methods remain appropriate. Moreover, other elements of network 10 and peer-to-peer network 50 may perform similar techniques to estimate network traffic.

Furthermore, although the present invention has been described in several embodiments, a myriad of changes and modifications may be suggested to one skilled in the art, and it is intended that the present invention encompass such changes and modifications as fall within the present appended claims.

What is claimed is:

1. A method for estimating network traffic comprising:
receiving and analyzing connectivity information associated with a network to identify a set of parameters, wherein the connectivity information includes a plurality of samples of user activities stored by a node on the network and the set of parameters includes a distribution of network resources across network regions of the network;
generating a statistical model of the network using the set of parameters, the statistical model mathematically predicting connectivity between the network regions;
modifying at least one of the parameters within the set;
simulating the network using the modified set of parameters and the statistical model; and
presenting results of the simulation for use in managing the network.

2. The method of claim 1, wherein receiving and analyzing the connectivity information associated with the network to identify the set of parameters comprises receiving and analyzing the samples of the user activities to identify network addresses that may be translated into network locations within the network regions.

3. The method of claim 1, wherein receiving and analyzing the connectivity information associated with the network to identify the set of parameters comprises receiving and analyzing cache information storing the samples to identify network addresses, which may be translated into network locations within the network regions, and amounts of time users connect to the network.

4. The method of claim 1, wherein receiving and analyzing the connectivity information associated with the network to identify the set of parameters comprises receiving and analyzing requests for information and responses to requests for information from peers on a peer-to-peer network associated with the network to identify network addresses, which may be translated into network locations within the network regions, and distributions of data files stored by peers on the peer-to-peer network.

5. The method of claim 1, wherein receiving and analyzing the connectivity information associated with the network to identify the set of parameters comprises receiving and analyzing published information regarding the network to identify relative uses of broadband and modem technologies to connect to the network.

6. The method of claim 1, wherein the statistical model comprises a transition matrix that includes statistical probabilities that a user of the network will access the network regions.

7. The method of claim 1, wherein the distribution of network resources across the network regions comprises a geographic distribution of network servers across geographic regions.

8. The method of claim 1, wherein the samples identify network addresses, which include Uniform Resource Locators (URLs) and Internet Protocol (IP) addresses of sources and destinations of data transfers associated with user activities, the user activities including Web surfing, instant messaging, and electronic mail transactions.

9. The method of claim 1, wherein the set of parameters further includes a network topology and a user population, wherein the network topology includes physical and virtual characteristics of network elements used by the network to transport data on the network.

10. The method of claim 1, wherein modifying at least one of the parameters within the set comprises increasing a user population associated with the network, and wherein simulating the network using the modified set of parameters and the statistical model comprises simulating the network using the increased user population and the statistical model.

11. The method of claim 1, further comprising:
    simulating the network using the set of unmodified parameters and the model;
    comparing results of the simulation using the set of unmodified parameters to other estimations of network traffic; and
    adjusting the model based on the results of the simulation using the set of unmodified parameters to correlate the model with the other estimations.

12. Logic for estimating network traffic, the logic encoded in media and operable when executed to:
    receive and analyze connectivity information associated with a network to identify a set of parameters, wherein the connectivity information includes a plurality of samples of user activities stored by a node on the network and the set of parameters includes a distribution of network resources across network regions of the network;
    generate a statistical model of the network using the set of parameters, the statistical model mathematically predicting connectivity between the network regions;
    modify at least one of the parameters within the set;
    simulate the network using the modified set of parameters and the statistical model; and
    present results of the simulation for use in managing the network.

13. The logic of claim 12, wherein receiving and analyzing the connectivity information associated with the network to identify the set of parameters comprises receiving and analyzing the samples of the user activities to identify network addresses that may be translated into network locations within the network regions.

14. The logic of claim 12, wherein receiving and analyzing the connectivity information associated with the network to identify the set of parameters comprises receiving and analyzing cache information storing the samples to identify network addresses, which may be translated into network locations within the network regions, and amounts of time users connect to the network.

15. The logic of claim 12, wherein receiving and analyzing the connectivity information associated with the network to identify the set of parameters comprises receiving and analyzing requests for information and responses to requests for information from peers on a peer-to-peer network associated with the network to identify network addresses, which may be translated into network locations within the network regions, and distributions of data files stored by peers on the peer-to-peer network.

16. The logic of claim 12, wherein receiving and analyzing the connectivity information associated with the network to identify the set of parameters comprises receiving and analyzing published information regarding the network to identify relative uses of broadband and modem technologies to connect to the network.

17. The logic of claim 12, wherein the statistical model comprises a transition matrix that includes statistical probabilities that a user of the network will access the network regions.

18. The logic of claim 12, wherein the distribution of network resources across the network regions comprises a geographic distribution of network servers across geographic regions.

19. The logic of claim 12, wherein the samples identify network addresses, which include Uniform Resource Locators (URLs) and Internet Protocol (IP) addresses of sources and destinations of data transfers associated with user activities, the user activities including Web surfing, instant messaging, and electronic mail transactions.

20. The logic of claim 12, wherein the set of parameters further includes a network topology and a user population, wherein the network topology includes physical and virtual characteristics of network elements used by the network to transport data on the network.

21. The logic of claim 12, wherein modifying at least one of the parameters within the set comprises increasing a user population associated with the network, and wherein simulating the network using the modified set of parameters and the statistical model comprises simulating the network using the increased user population and the statistical model.

22. The logic of claim 12, further operable when executed to:
    simulate the network using the set of unmodified parameters and the model;

compare results of the simulation using the set of unmodified parameters to other estimations of network traffic; and adjust the model based on the results of the simulation using the set of unmodified parameters to correlate the model with the other estimations.

23. A method for managing network traffic comprising:

analyzing peer-to-peer communications between peers on a peer-to-peer network;

identifying, based on the peer-to-peer communications, peer-to-peer information, the peer-to-peer information including network addresses of the peers, a distribution of peers within the peer-to-peer network, and a distribution of data files stored by the peers;

intercepting a control message sent from a first peer to a second peer;

generating a mathematical model of the network using the peer-to-peer information, the mathematical model suggesting appropriate modifications to the control message based on the peer-to-peer information; and modifying the control message based on the peer-to-peer information as suggested by the mathematical model.

24. The method of claim 23, further comprising:

identifying a third peer of the peer-to-peer network using the mathematical model, wherein a first distance between the first peer and the third peer is less than a second distance between the first peer and the second peer;

wherein modifying the control message as suggested by the mathematical model includes redirecting the control message to the third peer.

25. The method of claim 23, further comprising:

identifying a third peer of the peer-to-peer network using the mathematical model, wherein a first bandwidth between the first peer and the third peer is greater than a second bandwidth between the first peer and the second peer;

wherein modifying the control message as suggested by the mathematical model includes redirecting the control message to the third peer.

26. The method of claim 23, further comprising:

identifying a third peer of the peer-to-peer network using the mathematical model, wherein network congestion in a network region associated with the third peer is less than network congestion in a network region associated with the second peer;

wherein modifying the control message as suggested by the mathematical model includes redirecting the control message to the third peer.

27. The method of claim 23, wherein modifying the control message based on the peer-to-peer information includes modifying the control message to redirect the control message to a third peer, the third peer located in a same network region as the first peer.

28. The method of claim 23, wherein modifying the control message based on the peer-to-peer information includes controlling the time at which a data file requested by the first peer is transmitted to the first peer.

29. The method of claim 23, wherein modifying the control message based on the peer-to-peer information includes generating a response to the control message, the response identifying peers located in a same network region as the first peer and storing a requested data file.

30. The method of claim 23, wherein the distribution of peers identifies at least one network region of the peer-to-peer network associated with at least one set of peers.

31. The method of claim 23, wherein the control message requests a transmission of a particular data file to the first peer.

32. The method of claim 23, wherein the control message requests a list of peers storing a particular data file.

33. The method of claim 23, further comprising identifying bandwidth information associated with the peers based upon the peer-to-peer communications, wherein modifying the control message based on the peer-to-peer information includes redirecting the control message to a third peer based in part upon the bandwidth information.

34. The method of claim 23, further comprising identifying the second peer as a super peer within a subnetwork of the peer-to-peer network, wherein the super peer is operable to direct requests for data files among the peers.

35. Logic for managing network traffic, the logic encoded in media and operable when executed to:

analyze peer-to-peer communications between peers on a peer-to-peer network;

identify, based on the peer-to-peer communications, peer-to-peer information, the peer-to-peer information including network addresses of the peers, a distribution of peers within the peer-to-peer network, and a distribution of data files stored by the peers;

intercept a control message sent from a first peer to a second peer;

generate a mathematical model of the network using the peer-to-peer information, the mathematical model suggesting appropriate modifications to the control message based on the peer-to-peer information; and modify the control message based on the peer-to-peer information as suggested by the mathematical model.

36. The logic of claim 35, further operable when executed to:

identify a third peer of the peer-to-peer network using the mathematical model, wherein a first distance between the first peer and the third peer is less than a second distance between the first peer and the second peer;

wherein modifying the control message as suggested by the mathematical model includes redirecting the control message to the third peer.

37. The logic of claim 35, further operable when executed to:

identify a third peer of the peer-to-peer network using the mathematical model, wherein a first bandwidth between the first peer and the third peer is greater than a second bandwidth between the first peer and the second peer;

wherein modifying the control message as suggested by the mathematical model includes redirecting the control message to the third peer.

38. The logic of claim 35, further operable when executed to:

identify a third peer of the peer-to-peer network using the mathematical model, wherein network congestion in a network region associated with the third peer is less than network congestion in a network region associated with the second peer;

wherein modifying the control message as suggested by the mathematical model includes redirecting the control message to the third peer.

39. The logic of claim 35, wherein modifying the control message based on the peer-to-peer information includes modifying the control message to redirect the control message to a third peer, the third peer located in a same network region as the first peer.

40. The logic of claim 35, wherein modifying the control message based on the peer-to-peer information includes controlling the time at which a data file requested by the first peer is transmitted to the first peer.

41. The logic of claim 35, wherein modifying the control message based on the peer-to-peer information includes generating a response to the control message, the response identifying peers located in a same network region as the first peer and storing a requested data file.

42. The logic of claim 35, wherein the distribution of peers identifies at least one network region of the peer-to-peer network associated with at least one set of peers.

43. The logic of claim 35, wherein the control message requests a transmission of a particular data file to the first peer.

44. The logic of claim 35, wherein the control message requests a list of peers storing a particular data file.

45. The logic of claim 35, further operable when executed to identify bandwidth information associated with the peers based upon the peer-to-peer communications, wherein modifying the control message based on the peer-to-peer information includes redirecting the control message to a third peer based in part upon the bandwidth information.

46. The logic of claim 35, further operable when executed to identify the second peer as a super peer within a subnetwork of the peer-to-peer network, wherein the super peer is operable to direct requests for data files among the peers.

* * * * *